(12) United States Patent
Fritz et al.

(10) Patent No.: US 12,286,338 B2
(45) Date of Patent: Apr. 29, 2025

(54) METHOD FOR SUPPLYING A MOBILE USAGE UNIT WITH A CONSUMABLE

(71) Applicant: DEERE & COMPANY, Moline, IL (US)

(72) Inventors: Norbert Fritz, Ilvesheim (DE); Martin Kremmer, Laumersheim (DE)

(73) Assignee: DEERE & COMPANY, Moline, IL (US)

( * ) Notice: Subject to any disclaimer, the term of this patent is extended or adjusted under 35 U.S.C. 154(b) by 48 days.

(21) Appl. No.: 17/446,002

(22) Filed: Aug. 26, 2021

(65) Prior Publication Data

US 2022/0122383 A1 Apr. 21, 2022

(30) Foreign Application Priority Data

Oct. 21, 2020 (DE) .......................... 102020127743.1

(51) Int. Cl.
*B67D 7/04* (2010.01)
*B60W 60/00* (2020.01)
*G07C 5/00* (2006.01)

(52) U.S. Cl.
CPC .......... *B67D 7/0401* (2013.01); *B60W 60/001* (2020.02); *G07C 5/006* (2013.01); *G07C 5/008* (2013.01)

(58) Field of Classification Search
CPC .......... B67D 7/0401; B67D 2007/0457; B67D 2007/0459; B67D 2007/0461; B67D 7/30;

(Continued)

(56) References Cited

U.S. PATENT DOCUMENTS 6,237,647 B1   5/2001  Pong et al.
6,382,269 B1 * 5/2002  Tatsuno ............... B67D 7/0401
                                                       141/192

(Continued)

FOREIGN PATENT DOCUMENTS

AU    2018204155   *  1/2019  ............... G05D 1/02
AU    2018204155 A1    1/2019

(Continued)

OTHER PUBLICATIONS

EPAC System, Extended Performance Air Cleaner by Maradyne Filtration Systems, accessed from <URL: maradynefiltration.com/epac-system.html> on Jul. 19, 2021, 1 page.

(Continued)

*Primary Examiner* — Joan T Goodbody
(74) *Attorney, Agent, or Firm* — Taft Stettinius & Hollister LLP; Stephen F. Rost

(57) ABSTRACT

A method for supplying a mobile usage unit with a consumable delivered by a movable delivery connection of a maintenance station to a supply inlet of the mobile usage unit includes identifying via a sensor system a supply inlet of the mobile usage unit, the sensor system providing data to a control unit, fluidly connecting via the control unit the delivery connection to the identified supply inlet, delivering via the control unit the consumable to the supply inlet, and after the delivery of the consumable has terminated, fluidly separating via the control unit the delivery connection from the supply inlet.

17 Claims, 2 Drawing Sheets

(58) Field of Classification Search
CPC ...... B67D 2007/043; B67D 2007/0463; B67D 2007/0467; B67D 2007/0469; B67D 2007/0473; B60W 60/001; G07C 5/006; G07C 5/008
See application file for complete search history.

(56) References Cited

U.S. PATENT DOCUMENTS

| | | | | |
|---|---|---|---|---|
| 7,565,917 | B2* | 7/2009 | Kamiya | F16L 37/565 |
| | | | | 137/614.04 |
| 9,458,006 | B2* | 10/2016 | Quang | F15C 1/18 |
| 10,067,502 | B1 | 9/2018 | Delp | |
| 10,354,478 | B2 | 7/2019 | Guo et al. | |
| 10,410,182 | B1 | 9/2019 | Tang | |
| 10,585,439 | B2 | 3/2020 | Buttolo et al. | |
| 11,388,899 | B2* | 7/2022 | Long | A01M 7/0085 |
| 2004/0222904 | A1 | 11/2004 | Ciolli | |
| 2014/0049390 | A1 | 2/2014 | Wagner et al. | |
| 2014/0074667 | A1 | 3/2014 | Smith | |
| 2014/0129076 | A1* | 5/2014 | Mouchet | B60C 23/0479 |
| | | | | 701/1 |
| 2015/0186691 | A1 | 7/2015 | Loop | |
| 2017/0121019 | A1 | 5/2017 | Shin et al. | |
| 2017/0234775 | A1 | 8/2017 | Finch et al. | |
| 2017/0363432 | A1* | 12/2017 | Hall | B67D 7/04 |
| 2018/0096541 | A1 | 4/2018 | O'Brien et al. | |
| 2019/0009908 | A1 | 1/2019 | Perez Barrera | |
| 2019/0031343 | A1 | 1/2019 | Russell | |
| 2019/0135048 | A1 | 5/2019 | Thompson | |
| 2019/0176769 | A1 | 6/2019 | Strasdat et al. | |
| 2019/0266715 | A1 | 8/2019 | Myers | |
| 2019/0304100 | A1 | 10/2019 | Hever et al. | |
| 2019/0344679 | A1 | 11/2019 | Miller et al. | |
| 2019/0366375 | A1 | 12/2019 | Thompson et al. | |
| 2020/0064230 | A1 | 2/2020 | Kain Venkatadri et al. | |
| 2020/0074763 | A1 | 3/2020 | Deng | |
| 2020/0122599 | A1 | 4/2020 | Lee | |
| 2022/0068055 | A1 | 3/2022 | Fritz et al. | |
| 2022/0348322 | A1 | 11/2022 | Zemenchik | |

FOREIGN PATENT DOCUMENTS

| | | | |
|---|---|---|---|
| CA | 3111039 A1 | 3/2020 | |
| CN | 205144465 U | 4/2016 | |
| DE | 102012011538 A1 | 1/2013 | |
| DE | 102012025033 A1 | 6/2014 | |
| DE | 102018222650 A1 | 6/2020 | |
| KR | 20160129786 A | 11/2016 | |
| WO | 2001058735 A1 | 8/2001 | |
| WO | WO0158735 * | 8/2001 | ............ B67D 7/14 |
| WO | 2014080385 A2 | 5/2014 | |
| WO | WO 2014080385 * | 5/2014 | .......... A62C 3/0228 |
| WO | 2015088331 A1 | 6/2015 | |
| WO | WO2015088331 * | 6/2015 | .......... B67D 7/0401 |
| WO | 2019038188 A1 | 2/2019 | |
| WO | WO2019038188 * | 2/2019 | ............ E01H 1/101 |
| WO | WO2020023269 A1 | 1/2020 | |
| WO | WO2020041899 A1 | 3/2020 | |

OTHER PUBLICATIONS

GearEye, The ultimate tracking solution for your gear, accessed from <URL: https://www.geareye.co> on Jul. 19, 2021, 10 pages.
GX390 Engine with Cyclone Air Cleaner, Honda Engines introduces new Cyclone Air Cleaner, accessed from <URL: https://www.heavyequipmentguide.ca/article/22534/honda-engines-introduces-new-cyclone-air-cleaner> on Jul. 19, 2021, 5 pages.
European Search Report issued in European Patent Application No. 21201136.5, dated Mar. 21, 2022, 5 pages.
European Search Report issued in European Patent Application No. 21201137.3, dated Mar. 18, 2022, 7 pages.
Norbert Fritz et al., Method for Inspecting a Condition of a Mobile Usage Unit or of a Servicing Station, pending unpublished U.S. Appl. No. 17/444,309, filed Aug. 3, 2021, USPTO's IFW system.
European Search Report and Written Opinion issued in European Patent Application No. 21189553.7, dated Jan. 26, 2022, 9 pages.
European Search Report issued in European Patent Application No. 21201139.9, dated Feb. 21, 2022, 7 pages.

* cited by examiner

METHOD FOR SUPPLYING A MOBILE USAGE UNIT WITH A CONSUMABLE

RELATED APPLICATIONS

This application claims priority to German Patent Application No. 102020127743.1, filed Oct. 21, 2020, the disclosure of which is hereby expressly incorporated by reference in its entirety.

FIELD OF THE DISCLOSURE

The present disclosure relates to a method for supplying a mobile usage unit with a consumable.

BACKGROUND

Mobile usage units such as, for example, agricultural or forestry machines, are generally maintained at defined time intervals. A supply of the usage unit with at least one consumable, for example, an engine oil, often forms part of the maintenance or servicing measures.

There is a need to implement the supply of a mobile usage unit with a consumable in an efficient manner.

SUMMARY

According to the present disclosure, a method serves for supplying a mobile usage unit with a consumable (for example, lubricant for articulated or movable components of the usage unit or fuel for an internal combustion engine of the usage unit). The consumable is delivered by a movable delivery connection of a maintenance station to a supply inlet (for example, lubricating nipple, tank opening) of the usage unit. For the delivery of the consumable, initially the desired supply inlet of the usage unit is identified. The delivery connection is then fluidly connected to the identified supply inlet. This fluidic connection—optionally in addition to further operating conditions—is a prerequisite for a delivery of the consumable to the supply inlet. After the delivery of the consumable has been terminated, the delivery connection is fluidly separated again from the supply inlet.

The aforementioned method steps permit a simple method structure which provides an automated and efficient supply of the usage unit with a consumable, with low effort in terms of data technology. By the automated supply of the usage unit with the respective consumable, it is correspondingly possible to relieve the burden on the maintenance or service personnel who are used.

The delivery connection or the supply inlet may be opened and closed during the implementation of the method, such that a desired or predetermined quantity of the consumable is delivered with a high degree of accuracy. For example, a suitable technical control mechanism, which correspondingly activate the delivery connection or the supply inlet, is provided to this end. In each case, the delivery connection or the supply inlet may have a suitable activatable valve therefor.

The maintenance station serves as a device for an efficient and automated implementation of the method. It may be advantageous to design the maintenance station partially (in addition to a stationary sub-region) or entirely as a mobile maintenance unit. This mobile maintenance unit may be air-based (for example, a flying drone) or land-based (for example, a movable robot arm, traveling service vehicle). Under specific boundary conditions, an at least partially mobile maintenance station is able to supply the mobile usage unit with a consumable in an even more efficient and economical manner. This is the case, for example, when a usage unit has a plurality of supply inlets or the supply inlets have different positions, in the case of different types of usage unit.

Advantageously, the implementation of individual method steps of the method is controlled by a control unit in the maintenance station. The control unit contains all of the functions which are necessary for data processing and control of the method, such as for example, a microprocessor, a memory and suitable algorithms for processing and evaluating data and, where appropriate, the determined comparison results, and for introducing further method steps, such as for example, the termination of the delivery of the consumable to the supply inlet of the usage unit.

The control unit is able to navigate a mobile maintenance unit (for example, a drone, robot arm) with the delivery connection fastened thereto, and which is thus also mobile or movable, to the position of the supply inlet.

A movement control of the delivery connection to the position of the identified supply inlet is assisted by the maintenance station having a suitable sensor system. The signals or data generated by the sensor system (for example, image data) may be processed by the maintenance station, in particular in the control unit thereof. A control of the movement of the delivery connection or the mobile maintenance unit may be carried out as a function of the processing of the sensor system data.

The sensor system may contain technologically different sensors, probes or signal receivers. An optical sensor is particularly suitable, in particular a camera (for example, monocular, stereo). Further suitable sensors are UV sensors, ultrasonic sensors, radar sensors, antennae.

Relative to the antenna technology, the antenna is, in particular, an RFID antenna. For example, this RFID antenna may identify the supply inlet of the usage unit characterized by an RFID identifier and the position thereof. Alternatively or additionally to a position recognition function, a suitable sensor system may have a function for feature detection on the usage unit, in order to navigate the delivery connection in the direction of the supply inlet on the basis of this feature detection.

In one embodiment, the delivery connection has an activatable connection valve or the supply inlet has an activatable inlet valve. As a result, during the implementation of the method the delivery connection or the supply inlet may be opened and closed in a controlled manner which is simple in terms of technology. The use of valves assists a delivery of the consumable which is controlled in terms of safety technology and which is free from leakage. An activation of at least one of these valves is carried out by the aforementioned control unit. An activation for opening and closing at least one of the valves assists an automated and efficient execution of the method for supplying the usage unit.

In order to supply the consumable to the delivery connection, in particular with larger delivered quantities of the consumable, with low technical effort, the delivery connection is advantageously connected to a delivery line which is stored in the region of the maintenance station in a manner in which it is able to be rolled up and unrolled. The delivery line serves for the transport of the consumable from a central source, for example, a stationary storage container, to the delivery connection. The delivery line is stored, in particular, on a rotationally movable storage drum, as is known for example, from electric cable drums. A space-saving effective working length of the delivery line is advantageously achieved during the delivery processes by the rotational movement of the storage drum being controlled by a drive unit (for example, an electric motor) as a function of a detected movement of the delivery connection or a maintenance drone bearing the delivery connection. Additionally, the maintenance drone may also be connected to an energy supply line or a data line.

The consumable to be delivered to the usage unit is stored in a storage container which is fluidly connected to the delivery connection. This fluidic connection may be designed as a permanent or separable connection. The storage container may be arranged above-ground or below-ground and, in particular, is a component of the maintenance station. In this case, the storage container may be a component of a stationary region of the maintenance station or arranged on a mobile maintenance unit.

For example, the storage container is integrated as a cartridge which is filled with the consumable in a mobile maintenance unit configured as a maintenance drone. In a further embodiment, the mobile maintenance unit is configured as a robot arm with suitable articulated elements and means for adjusting the length of the robot arm, in order to navigate the robot arm with a delivery connection fastened thereto into different positions and orientations relative to the usage unit. The robot arm may have an internal delivery line which is fluidly connected to the delivery connection. Alternatively, the robot arm may bear an external (for example, tubular) delivery line which is fluidly connected to the delivery connection. The consumable is transported from a storage container via the delivery line to the delivery connection.

Irrespective of the embodiment of the maintenance station, the transport of the consumable from a storage container to the delivery connection is carried out at a delivery pressure. For example, to this end a suitable delivery pump is provided or a cartridge filled with consumable is pressurized.

Advantageously, the delivery of the consumable is terminated as a function of a comparison with a predetermined limit value. The use of a predetermined limit value in order to decide whether the delivery of the consumable is terminated, assists the time-saving supply of the usage unit with the consumable. Moreover, the consideration of the limit value assists an economical usage of the consumable which is used. For example, depending on the result of a comparison of a current delivery state (for example, a currently delivered quantity of a consumable) with the limit value, it is possible to decide whether or not a supply of the usage unit with the consumable is to be terminated. The limit value, for example, is a predetermined filling state on the usage unit (for example, in the tank container for fuel) or a predetermined quantity (for example, in liters) which is to be delivered from a storage container to the supply inlet of the usage unit.

Advantageously, the automated supply of the usage unit with a consumable according to the method is used in applications in which specific automated functions are particularly suitable for increasing efficiency, for example, in large agricultural operations or in a (partially) autonomous vehicle fleet.

The mobile usage unit is a utility vehicle (for example, an agricultural or forestry machine, construction machine) or an attachment (for example, a soil treatment device, plow). The attachment may also be regarded as a mobile usage unit if it is movable at least in operation. In particular, the attachment is coupled to the utility vehicle (for example, a tractor) and, as a result, movable at least during the operation of the utility vehicle.

The utility vehicle is configured, in particular, as a (partially) autonomous vehicle. An automated handling of the vehicle may be efficiently assisted by the disclosed method steps for supplying with a consumable.

The method permits an automated and efficient supply of the mobile usage unit with different consumables which are relevant for the operation of the usage unit. In principle, the consumable is an operating medium which is at least partially consumed during the operation of the usage unit and thus has to be replenished or which has to be replaced due to specific properties (for example, reduction in quality, contamination) and thus also has to be replenished.

For example, the consumable is a lubricant (in particular oil, grease) such as is required, for example, for (wheel) axles and other movable parts or components of the usage unit. In a further application, the consumable is a fuel for an internal combustion engine of the usage unit.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
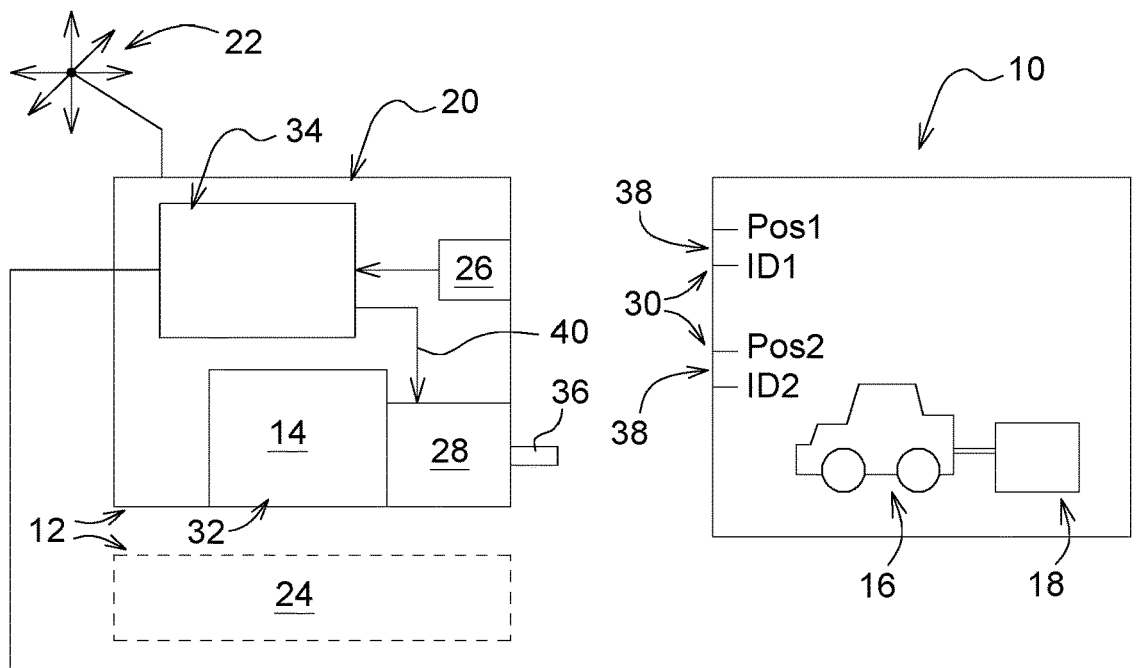
FIG. 1 shows a first embodiment of the method according to the present disclosure for supplying a mobile usage unit with a consumable.
Figure 1:
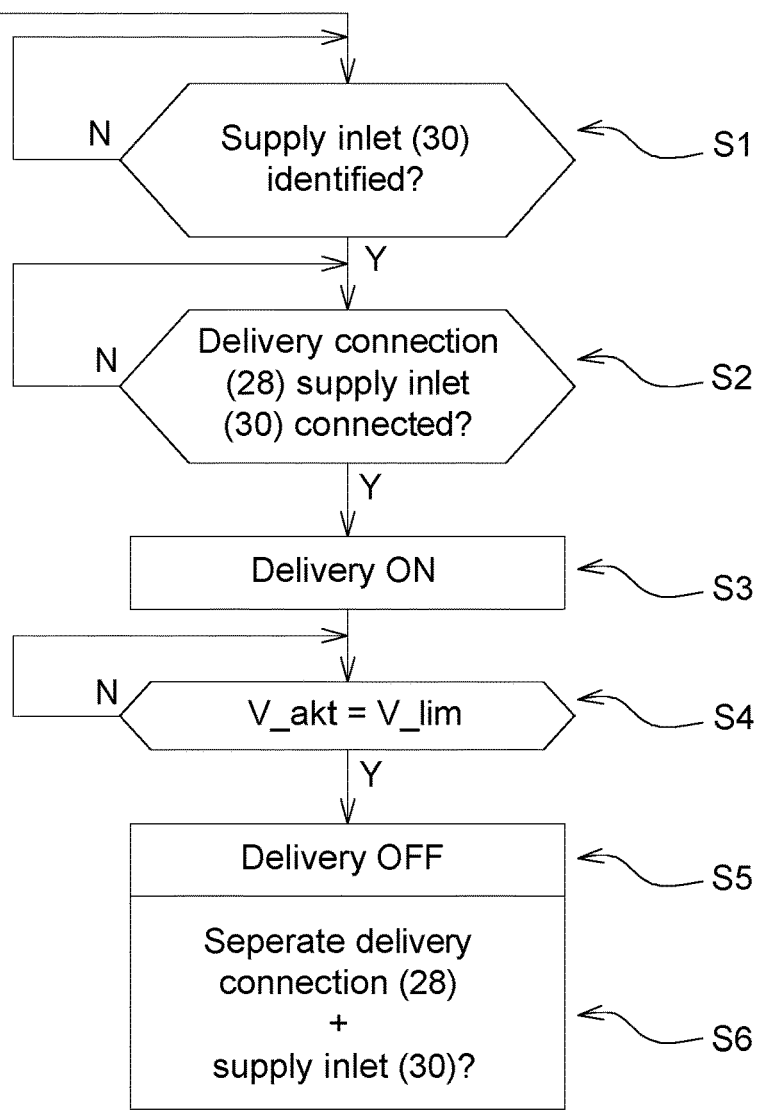

FIG. 1 shows schematically a mobile usage unit 10 and a maintenance station 12. The maintenance station 12 serves for the maintenance of the usage unit 10, in particular for the supply of the usage unit 10 with a consumable 14 (for example, a lubricant). Various method steps of the method for the supply of the usage unit 10 with the consumable 14 are shown in FIG. 1 in the form of a flow chart.

The mobile usage unit 10 consists, for example, of a tractor 16 or an attachment 18 coupled thereto, for example, a plow or a further soil treatment device. The usage unit 10 is driven, either with a driver or as a (partially) autonomous vehicle without a driver, for maintenance, in particular for supplying with a consumable, to the maintenance station 12. Depending on the embodiment of the maintenance station 12, this may also be moved toward the usage unit 10 for implementing the method.

The maintenance station 12 contains a mobile maintenance unit 20 (for example, a drone), the movement thereof being controlled relative to the mobile usage unit 10, which is indicated by the arrow directions 22. Optionally, and thus indicated in FIG. 1 with dashed lines, the maintenance station 12 may also have a stationary sub-region 24 which thus may at least partially contain technical functions which are otherwise implemented in the mobile maintenance unit 20.

A sensor system 26 (for example, RFID antenna or camera) and a delivery connection 28 are arranged on the maintenance unit 20. The delivery connection 28 is also movable as a component of the mobile maintenance unit 20. The consumable 14 is delivered to the supply inlet 30 of the usage unit 10 by the delivery connection 28.

The consumable to be delivered 14 is stored in a storage container 32 which is configured as a replaceable cartridge. At least during the delivery process, the delivery connection 28 is fluidically connected to the storage container 32.

The data generated by the sensor system 26 (for example, image data) are supplied to a control unit 34 which contains the usual components for data processing and controlling individual method steps, such as for example, a microprocessor, memory, software program, suitable algorithms and the like. The control unit 34 is integrated in the maintenance unit 20.

The respective supply inlet 30 is identified by the sensor system 26. To this end, for example, an ID identifier ID1, ID2 or a position Pos1, Pos2 is identified by the sensor system 26. In these aforementioned examples, the sensor system 26 has an RFID antenna or a position sensor. The data generated by the sensor system 26 is processed in the control unit 34 such that the control unit 34 navigates the mobile maintenance unit 20 and thus the delivery connection 28 to the respective supply inlet 30.

For a fluidic connection between the delivery connection 28 and the supply inlet 30, for example, a delivery nozzle 36 may be connected to the delivery connection 28, said delivery nozzle being connected to a nipple 38 of the supply inlet 30.

For a delivery of the consumable 14 which is simple in terms of technology, the consumable 14 is stored under pressure in the storage container 32. The consumable 14 is then automatically transported through the delivery connection 28 as soon as said delivery connection permits a throughflow of the consumable 14. This throughflow or an interruption of the throughflow may be controlled, for example, by the control unit 34 by corresponding control signals 40 which the control unit 34 transmits to the delivery connection 28.

During the implementation of the method for supplying the usage unit 10 with the consumable 14, the supply inlet 30 to be supplied with the consumable 14 is identified and activated by the maintenance unit 20 (step S1). As soon as the delivery connection 28 has reached the correct position relative to the identified supply inlet 30, it is assumed therefrom that the delivery connection 28 and the supply inlet 30 are fluidically connected together (step S2). Then the control unit 34 controls the delivery connection 28 via control signals 40 in order to permit a throughflow of the consumable 14 (delivery ON, step S3). The consumable 14 which is stored under pressure in the storage container 32 is then automatically delivered to the supply inlet 30.

The quantity or a volume V_akt (for example, in liters or cm$^3$) of the consumable 14 delivered to the supply inlet 30 is appropriately determined (for example, by a flow sensor at the delivery connection) and compared with a predetermined limit value in the form of a predetermined limit volume V_lim of the consumable 14 (step S4).

As soon as the limit volume V_lim is reached, the conveyance of the consumable 14 is terminated (delivery OFF, step S5). This is achieved, for example, by the control unit 34 transmitting corresponding control signals 40 to the delivery connection 28 for interrupting the throughflow.

After the delivery of the consumable 14 is terminated, the delivery connection 28 is fluidically separated from the supply inlet 30 (step S6). To this end, the maintenance unit 20 is navigated away from the supply inlet 30 toward a different position. This different position is, for example, a supply inlet 30 which is to be supplied next or a parked position of the maintenance station 12.

Figure 2:
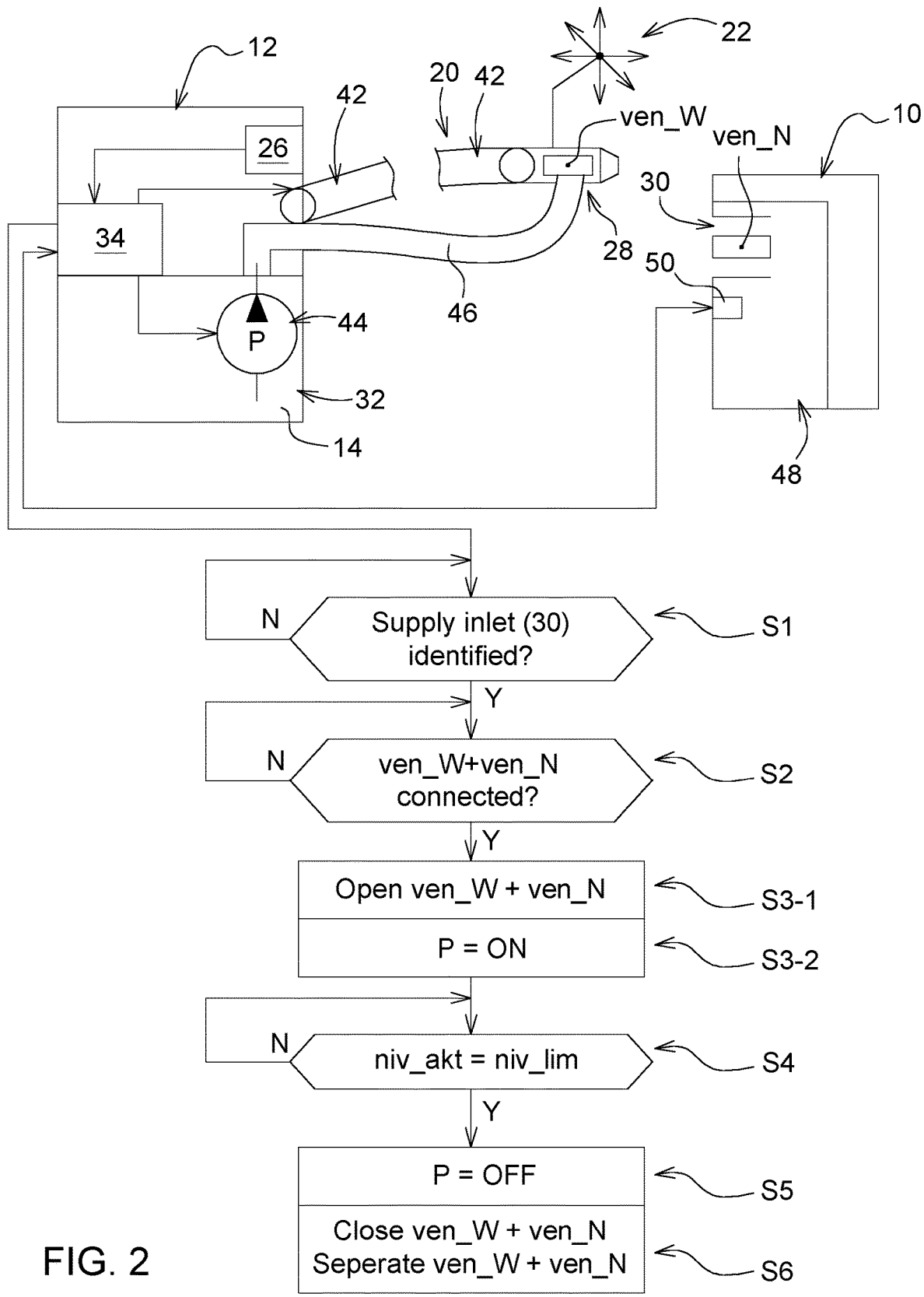
FIG. 2 shows a further embodiment of the method according to the present disclosure for supplying a mobile usage unit with a consumable.

In FIG. 2 the maintenance station 12 has a movable robot arm 42 as a mobile maintenance unit 20. The robot arm 42 is shown here merely schematically and may have one or more movable arm portions and suitable joints.

Fuel (for example, diesel) for an internal combustion engine of the usage unit 10 or the tractor 16 is stored, for example, as a consumable 14 in the storage container 32 (arranged above-ground or below-ground). A delivery pump 44 which is arranged in the storage container 32 or alternatively outside the storage container 32 is activated by the control unit 34 in order to transport the consumable 14 to a connection valve ven_W of the delivery connection 28 during the implementation of the method. A flexible delivery line 46 is provided for the transport, said flexible delivery line being fluidically connected to an outlet of the delivery pump 44 and to the delivery connection 28 or the connection valve ven_W thereof. The delivery line 46 is mechanically fixed in a suitable manner at one or more points for the flexible mobility thereof.

Similar to the embodiment according to FIG. 1, in the variant according to FIG. 2 for the supply of the usage unit 10 with the consumable 14 the desired supply inlet 30 is initially identified and activated by the maintenance unit 20 or the robot arm 42 (step S1). In this case, for a correct control of the movement of the robot arm 42, signals or data of the sensor system 26 are processed in the control unit 34. The movement of the robot arm 42 is controlled by corresponding control signals of the control unit 34 and further suitable means.

As soon as the delivery connection 28 has reached the correct position relative to the identified supply inlet 30, the connection valve ven_W is coupled or fluidically connected to an inlet valve ven_N of the supply inlet 30 (step S2). Then the two valves ven_W, ven_N are activated (in a suitable manner by the control unit 34) such that both valves ven_W, ven_N are opened for a throughflow of the consumable 14 (step S3-1). Then in step S3-2 the delivery pump 44 is activated for the transport of the consumable 14 (P=ON).

The supply inlet 30 and the inlet valve ven_N thereof are arranged on an inlet region of a tank container 48 of the usage unit 10. A level sensor 50 is arranged on the tank container 48. This level sensor determines whether the consumable 14 to be delivered into the tank container has reached a maximum level, i.e., a predetermined limit level niv_lim (step S4).

As soon as the limit level niv_lim is reached, the control unit 34 receives corresponding sensor signals (in a wired or wireless manner) from the level sensor. The control unit 34 then terminates the delivery of the consumable 14 by deactivating the delivery pump 44 (P=OFF, step S5).

After the delivery of the consumable 14 has been terminated, the two valves ven_W, ven_N are activated (in a suitable manner by the control unit 34) such that both valves ven_W, ven_N are closed or interrupted relative to a throughflow of the consumable 14 (step S6).

Moreover, in step S6 the delivery connection 28 is fluidically separated from the supply inlet 30. To this end, the robot arm 42 is navigated away from the supply inlet 30 toward a different position. This different position, for example, is a supply inlet 30 which is to be supplied next, or a parked position of the robot arm 42 on the maintenance station 12.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for supplying a mobile usage unit with a consumable delivered by a movable delivery connection of a maintenance station to a supply inlet of the mobile usage unit, comprising:
   storing the consumable in a storage container fluidly connected to the delivery connection wherein the connection includes a delivery line stored on a rotationally moveable storage drum;
   identifying a supply inlet of the mobile usage unit via a sensor system arranged on the maintenance station, the sensor system providing data to a control unit;
   adjusting the effective working length of the delivery line via a drive unit, the drive unit rotating the storage drum as a function of detected movement of the delivery connection;
   fluidly connecting via the control unit the delivery connection to the identified supply inlet;
   delivering via the control unit the consumable to the supply inlet; and
   after the delivery of the consumable has terminated, fluidly separating via the control unit the delivery connection from the supply inlet.

2. The method as claimed in claim 1, wherein the delivery connection comprises a connection valve and the supply inlet comprises an inlet valve, wherein the connection valve and the inlet valve are configured to be activatable by the control unit, and further comprising opening the connection valve and the inlet valve via the control unit, and after the delivery of the consumable has terminated, closing the connection valve and the inlet valve via the control unit and fluidly separating via the control unit the delivery connection from the supply inlet.

3. The method as claimed in claim 1, wherein the maintenance station comprises a mobile maintenance unit.

4. The method as claimed in claim 1, wherein the delivery connection includes an activatable connection valve.

5. The method as claimed in claim 1, the supply inlet includes an activatable inlet valve.

6. The method as claimed in claim 1, further comprising:
   terminating via the control unit the delivery of the consumable as a function of a comparison with a predetermined limit value.

7. The method as claimed in claim 2, further wherein the consumable is stored in a pressurized storage container.

8. The method as claimed in claim 2, wherein the mobile usage unit includes a utility vehicle or an attachment.

9. The method as claimed in claim 2, wherein the mobile usage unit includes an autonomous vehicle.

10. The method as claimed in claim 2, wherein the consumable includes a lubricant for a movable component.

11. The method as claimed in claim 2, wherein the connection valve is adjacent to the inlet valve.

12. The method as claimed in claim 11, wherein the control unit is configured to control one or more of the inlet valve, the connection valve, or both the inlet valve and the connection valve simultaneously.

13. A method for supplying a mobile usage unit with a consumable delivered by a movable delivery connection of a maintenance station to a supply inlet of the mobile usage unit, comprising:
   storing the consumable in a storage container fluidly connected to the delivery connection wherein the connection includes a delivery line stored on a rotationally moveable storage drum;
   identifying the supply inlet of the mobile usage unit via a sensor system arranged on the maintenance station, the sensor system providing data to a control unit;
   adjusting an effective working length of the delivery line via a drive unit, the drive unit rotating the storage drum as a function of detected movement of the delivery connection;
   fluidly connecting via the control unit the delivery connection to the identified supply inlet, the delivery connection including an activatable connection valve, and the supply inlet including an activatable inlet valve;
   delivering via the control unit the consumable to the supply inlet;
   terminating via the control unit the delivery of the consumable as a function of a comparison with a predetermined limit value; and
   fluidly separating via the control unit the delivery connection from the supply inlet.

14. The method as claimed in claim 1, wherein the drive unit is an electric motor.

15. The method of claim 1, wherein the delivery line is coupled to a maintenance drone via the delivery connection, and the drive unit controls the effective working length of the delivery line by controlling the rotational movement of the storage drum, wherein the drive unit rotates the storage drum as a function of a detected movement by the maintenance drone.

16. The method as claimed in claim 1, wherein the effective working length of the delivery line is achieved by rolling up and unrolling the delivery line via the storage drum.

17. The method of claim 1, wherein the delivery line is coupled to a stationary storage container and to the delivery connection, wherein the effective working length of the delivery line is achieved during a delivery process by rotational movement of the storage drum being controlled by the drive unit as a function of a detected movement of the delivery connection or a maintenance drone bearing the delivery connection.

* * * * *